Nov. 13, 1923.　　　　　　　　　　　　　　　1,474,283
H. NYSTROM ET AL
CONVERTIBLE BODY FOR AUTOMOBILES
Original Filed May 1, 1922　　3 Sheets-Sheet 1

Herman Nystrom
Rudolph E. Nelson.
INVENTORS

Nov. 13, 1923.

H. NYSTROM ET AL 1,474,283

CONVERTIBLE BODY FOR AUTOMOBILES

Original Filed May 1, 1922   3 Sheets-Sheet 2

Herman Nystrom
Rudolph E. Nelson
INVENTORS

BY Victor J. Evans
ATTORNEY

WITNESS:

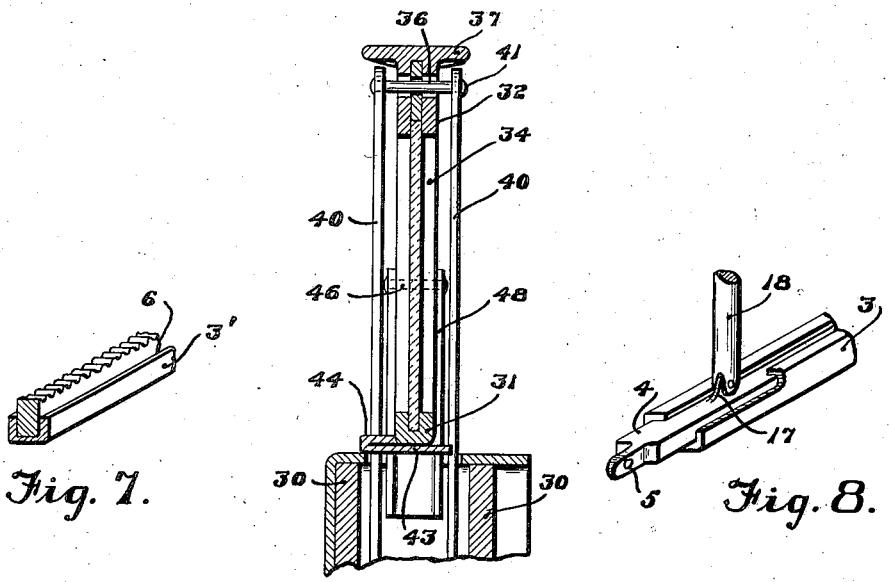
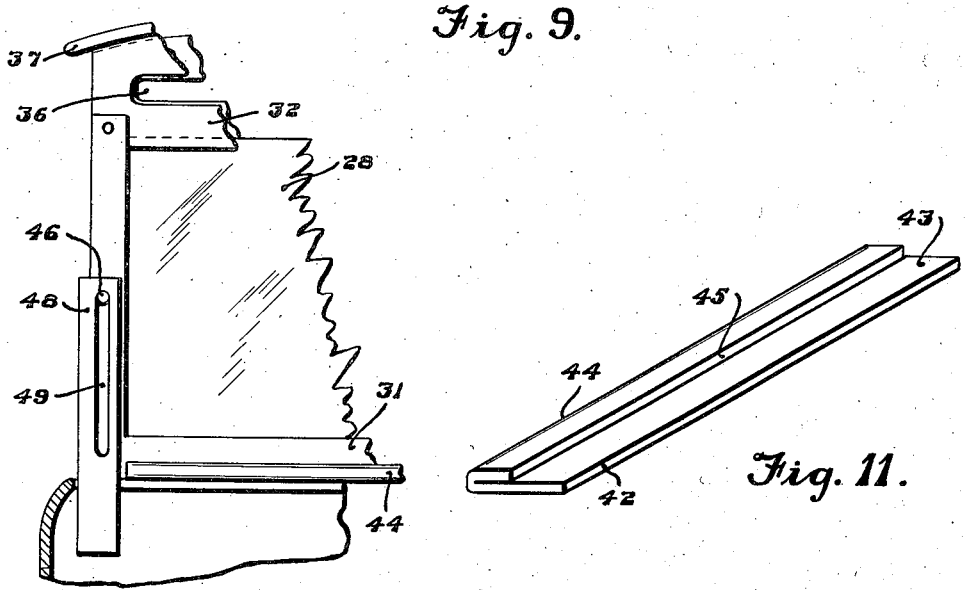
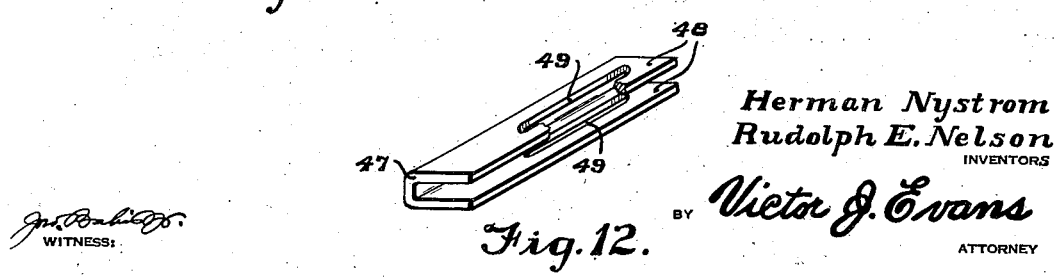

Patented Nov. 13, 1923.

1,474,283

UNITED STATES PATENT OFFICE.

HERMAN NYSTROM AND RUDOLPH E. NELSON, OF PHILADELPHIA, PENNSYLVANIA.

CONVERTIBLE BODY FOR AUTOMOBILES.

Application filed May 1, 1922. Serial No. 557,520. Renewed October 6, 1923.

*To all whom it may concern:*

Be it known that we, HERMAN NYSTROM and RUDOLPH E. NELSON, citizens of the United States, residing at Philadelphia, in the county of Philadelphia and State of Pennsylvania, have invented new and useful Improvements in Convertible Bodies for Automobiles, of which the following is a specification.

This invention relates to convertible bodies for automotive vehicles in which the deck or cover of the body can be raised or lowered at will or adjusted in such a manner and to such a position as to transform the rear portion of a roadster type of body into an express body type with a slightly inclined deck or cover thereover.

The invention further relates to means for providing a windshield for such a body which is adapted to be disappeared or moved into a provided recess in the car body when it is not desired to be used in raised or operative position.

The objects of our invention are to provide novel means by which the motor car can be equipped with a body similar in appearance to the roadster type of vehicle when the deck or cover is closed, but which deck or cover may be raised relative to the main body portion behind the seat of the car and held in any desired position of elevation and thereby transform the body into an open express carrying type vehicle, the same being adapted for the transportation of luggage or merchandise.

Another object is to provide a mechanism for holding and operating a windshield behind the driver's seat such that the windshield may be held in raised position when desired or can be closed to recede into a compartment at the back of the driver's seat or disappeared into the car body as the type of body is converted from roadster to express or vice versa.

Another object of this invention consists in the provision of means in combination with the aforesaid raisable deck or cover and windshield whereby the driver's seat may be temporarily covered to guard or protect said driver in inclement weather.

With the foregoing and other objects in view as will be more apparent from the following description this invention consists essentially in the novel features of construction, combinations and arrangements of parts hereinafter fully described and more particularly defined by the appended claims.

In the further disclosure of the invention reference is to be had to the accompanying sheets of explanatory drawings constituting a part of the specification and in which like characters of reference designate the same or corresponding parts in all the views.

Figure 7 is a perspective detail view partly in cross section of a rack adapted to co-operate with a pinion and sliding member to raise or lower the deck or cover and a guiding channel for the rack.

Figure 8 is a detail perspective view of a sliding member and a pivotally adjusted link attached thereto for co-operating with a rack and pinion to raise and lower the deck or cover, and a guiding channel or bed partly broken away in which said sliding member is transversed.

Figure 9 is a cross sectional elevation in detail showing the windshield in raised position and the relative positions of the operating and retaining members being an enlarged view of similarly shown parts in Figure 2.

Figure 10 is a front elevation of a side section of the windshield with a portion broken away showing a slotted guide and support to control the alignment of the windshield.

Figure 11 is a perspective detail of a detachable supporting strip or stop adapted to hold and lock the windshield in raised position; and, Figure 12 is a perspective detail view of the slotted guide shown in Figure 10 with a portion of one side broken away.

Figure 1:
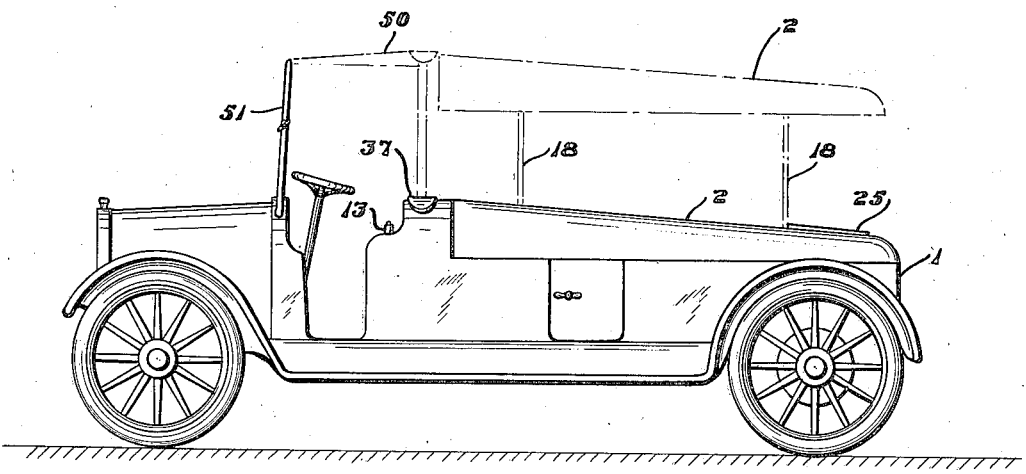
Figure 1 is a side elevation of a motor car equipped with the convertible body of the roadster type showing in dotted lines the cover or deck in raised position.

Referring more particularly to the drawings our convertible car body includes a lower body portion 1 that is mounted in the usual way on the chassis of a motor car and an adjustable deck or cover 2, said body being constructed of sheet metal or other suitable material. In the bottom of the lower body portion 1 on the opposite sides thereof, and longitudinally of said body are stationary channels or guide members 3 in each of which is removably mounted a sliding member 4 that is pivotally linked at 5 to a longitudinally sliding rack 6. This sliding rack 6 is mounted in a U-shaped extension 3' of the guiding channel member 3. Each rack 6 is provided with teeth on its upper face adapted to be engaged by and mesh with the teeth of pinions 7 mounted on each end of a transverse shaft 8 located near the forward end of the car body and carried in the bottom thereof being held in operative position by journals or boxes 9 to the base blocks 10 located in the car bottom on opposite sides thereof substantially below the driver's seat. Between the pinions 7 substantially sideways thereof is a pinion 11 mounted on and fixed to the aforesaid shaft 8. Adjacent to said pinion 11 and rockably mounted on said shaft 8 is a lever 12 provided with a hollow handle 13 through and in which is mounted a spring controlled plunger 14 linked to a ratchet or pawl 15 rockably pivoted at 16 to the side of the lever 12, in such a manner as to engage the teeth of said pinion 11 and by this means to rotate the shaft 8 and pinions 7 carried thereon backwardly and forwardly as the lever is rocked back and forth. As the shaft 8 is rotated in one direction and pinions 7 engage the rack 6, the racks 6 are drawn longitudinally forward and drawing with them the sliding members 4; and as the shaft 8 is rotated in the opposite direction and the pinions 7 engage the rack 6, the rack 6 and sliding members 4 are pushed longitudinally backward. The sliding members 4 are provided with upwardly extending lugs 17 on their top faces. These lugs 17 are provided with apertures adapted to receive pins or bolts or other suitable fastening means by which standards or link members 18 having corresponding apertures at their opposite ends 19 are adapted to be rockably or pivotally connected to said sliding members 4 and be actuated by the movement of the rack 6 and sliding members 4.

The upper ends of the standards or link members 18 are pivotally connected to the downwardly extending ends of brackets or supporting members 20 by means of pins or other suitable fastening means which extend through apertures in said bracket ends and corresponding apertures in the adjacent ends 19 of the link members 18. The base or feet of said brackets 20 are firmly affixed to the inner side of the top of the deck or body cover 2 at suitable points intermediate the end portions thereof by any suitable fastening means.

By this means when the pinions 7 are actuated and have moved the rack 6 and sliding member 4 into the desired position, the standards or link members 18 will be moved into a vertical position and lift the deck or cover 2, and hold the deck or cover in any desired position of elevation. Near the upper and inner edge of the lower body portion 1 of the car body and intermediate the forward and rear ends thereof are mounted on said body portion swiveled ring members 21, having a shank 22 which is rotatably held in an annular case or socket 23, which is rigidly held in place against the inner face of the opposite sides of the lower body portion 1 of the car body, by means of rivets or bolts 24, which pass through the sides of said body portion and through openings in the base of said annular case or socket 23. These swivelled ring members 21 are thus firmly held in position, extending inwardly from the opposite inner sides of the lower body portion 1, and while enabled to withstand any necessary strain imposed by the standards or link members 18, during or after the operation of raising or lowering the deck or cover 2, are at the same time permitted to turn to any degree upon the axis of the shank 22. These swivelled ring members 21 co-operate with the other mechanism described, by receiving the link members 18 and retaining and guiding them in the opening of the ring portion of the members 21, so that they provide a pivot or fulcrum for the link members 18, which are adapted to slide therein, as they are actuated to raise and lower the deck or cover 2, and to act as supports or braces to steady and support the link members 18 when the cover or deck is raised.

The deck or cover 2, is provided near its rear end with an opening to permit access to the body portion 1 when the deck or cover 2 is in closed or lowered position. A lid 25 is provided to cover this opening. This lid 25 is mounted on a hinge 26 of substantially L-shaped construction, having one end pivotally linked to the under side of said lid 25 and its other end pivotally linked to a bracket 20, so that when it is desired to open the lid 25, it can be slid longitudinally forward on the deck or cover 2 and thus give easy access to the interior of the body portion when the deck or cover 2 is in lowered or closed position. It may be then drawn backwardly and close the opening, being held in proper position by the L-shaped hinge 26.

Figure 2:
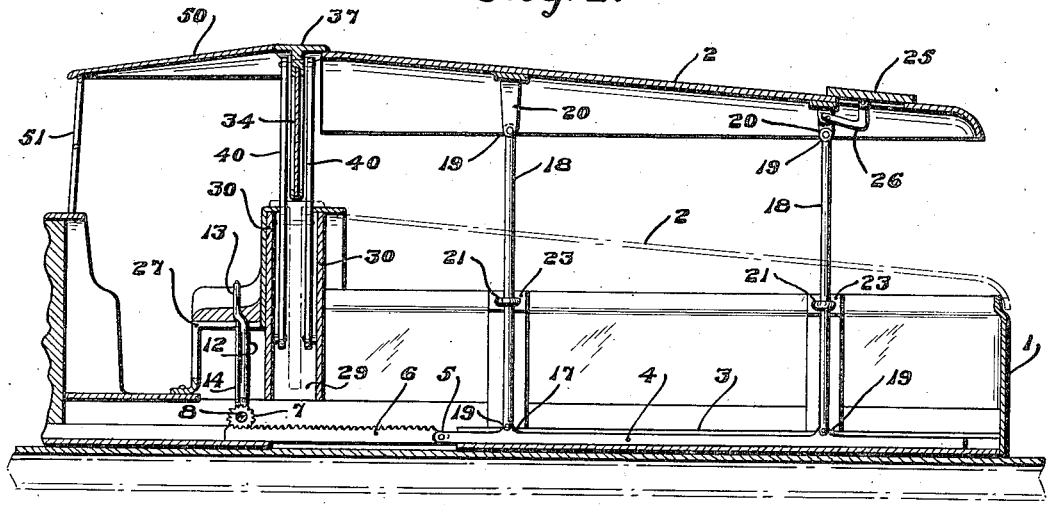
Figure 2 is a cross-section of the convertible body of the roadster type, with the front portion partly broken away and illustrating the deck or cover and windshield in raised position, means for raising said cover and showing by dotted lines the cover or deck lowered.
Figure 3:
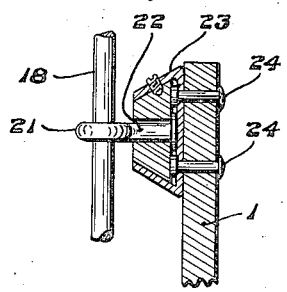
Figure 3 is a detail view partly in cross section of a swivel ring or fulcrum carrying a section of a hinge or link member.

The operation of our device is convenient and easy. With the deck or cover in closed position as shown in Fig. 1 it may be lifted to raised position as shown in Fig. 2 by the following operation. The driver or operator of the car conveniently reaching the handle of the lever 12 from the car seat, pushes the lever 12 forwardly through part of a circle and the ratchet 15 being in engagement with the teeth of the pinion 11 rotates said pinion 11 a part turn forwardly, thus similarly rotating the shaft 8 carrying said pinion 11 and pinions 7. The pinions 7 being meshed with the racks 6 actuate the racks 6 and the sliding members 4 connected to the ends of said racks, and force said racks and sliding members 4 backwardly. The sliding members 4 carrying the link members 18, by this backward movement force the link members 18 upwardly. The link members 18 are pivotally mounted at 17 on said sliding members 4 and pass through the swiveled rings 21, which thus provide them with a fulcrum and guide them in their upward movement.

As the sliding members 4 are forced backwardly the link members 18 are forced further outward and upward carrying with them the deck or cover 2 and continue to lift it in a substantially horizontal plane, until the link members 18 have been lifted to their full extent and assured a substantially vertical position in reference to the main body portion 1. When the link members are in this vertical position, the deck or cover 2 is in position of final elevation and the link members 18 are held in vertical position by the swiveled ring members 21 and the sliding members 4 in the channel members 3.

The deck or cover is thus held steadily and rigidly in position by the link members when in position of full elevation as shown in Fig. 2. To lower the deck or cover 2 the lever is again actuated by the operator, the ratchet 15 engaging the pinion 11 and turning it in the opposite direction and thus the shaft 8 and the pinions 7 are reversely rotated, drawing the racks 6 the sliding members 4 forwardly, thus withdrawing the link members 18 downwardly, into the body portion 1 of the car body and carrying down with them the deck or cover 2, until it has again covered the body portion 1 as shown in Fig. 1.

Between a seat 27 and the forward end of the body portion and deck or cover 2, we provide a windshield 28 and compartment 29 for receiving and carrying it and its framework and operating apparatus. The compartment 29 is formed by a longitudinal extension of the opposite lateral sides of the body portion 1 and by two substantially vertical partitions 30, spaced apart, parallel to each other and transversely disposed to the forward end of the main body portion 1 of the car body.

These transverse partitions 30 are built into the car body and made a part thereof. This compartment is of such shape and size as to receive and conveniently retain the windshield when the same is in dropped or disappeared position, as shown in Fig. 1, Fig. 4 and Fig. 5.

The windshield is provided with a usual glass plate, which is mounted in a vertically slidable and preferably rectangular frame of wood, stamped metal or other suitable material. The frame is made up of a base member 31 a top member 32 and lateral members 33 and 34 all suitably fastened in rigid relation to each other, to retain the glass.

Figure 4:
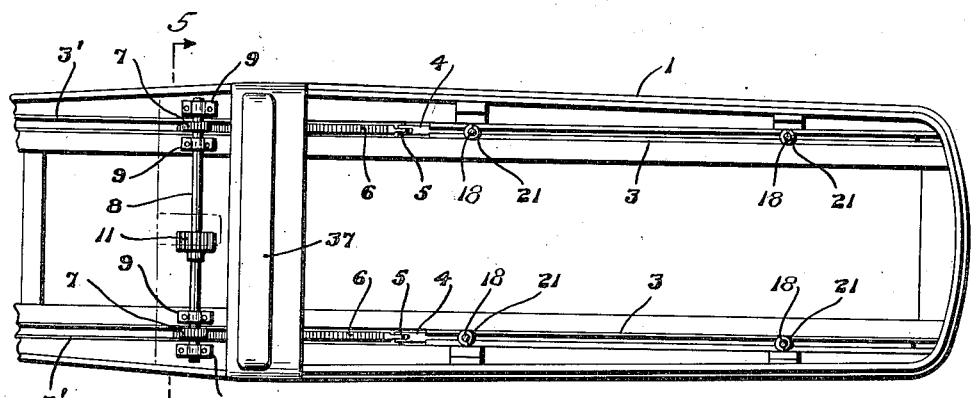
Figure 4 is a plan view of the convertible body of the roadster type with the cover or deck removed and showing in detail some of the mechanism for raising or lowering the deck or cover.
Figure 5:
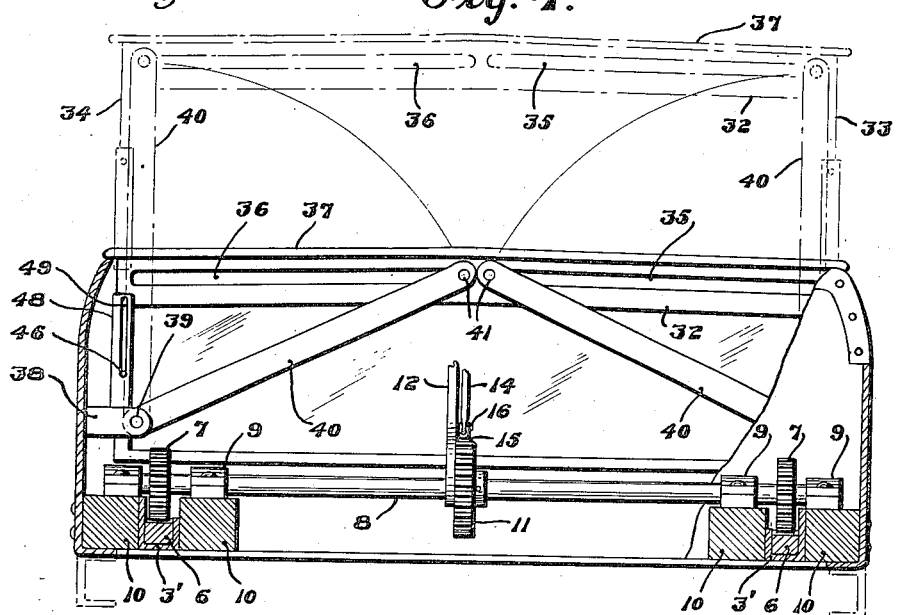
Figure 5 is a cross sectional view taken on the line 5—5 in Figure 4 and showing the windshield controlling mechanism with the windshield in drop position, the dotted lines indicating the windshield raised and the pinion carrying transverse operating shaft and ratchet mechanism for raising and lowering the deck or cover.
Figure 6:
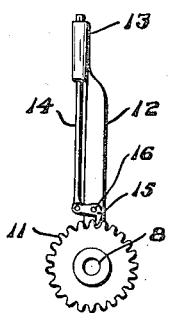
Figure 6 is an elevation of the intermediate gear which is carried on the transverse shaft and the ratchet and lever for actuating same.

The top member 32 is provided with two similar slotted openings 35 and 36 extending longitudinally and partially along its length and an enlarged overhanging angularly disposed top portion 37, extending along its length, adapted to form a lid or cover, to close the top of the windshield compartment when the windshield is in dropped position, as shown in Fig. 1, Fig. 4 and Fig. 5.

Mounted on the opposite inner faces of the forward extended portion of the main body portion 1 of the car body, which forms the windshield compartment, are lugs or brackets 38, which are located near the bottom of the car body. These lugs or brackets 38 are provided with pins or studs 39, adapted to rockably carry the links or arms 40, which have an opening at their lower ends to movably engage said studs 39, so that they may be swung or rocked laterally thereon and at the same time be held in operative relation thereto. The opposite ends of said links or arms 40 are provided with pins 41, passing through said slotted portions 35 and 36 of the top member 37 and adapted to move back and forth longitudinally in said slots, when said windshield is lifted from its compartment into elevated position, as shown in Fig. 2 and in dotted lines in Fig. 5, the purpose of arms 40 being to hold the windshield elevated. We provide a detachable supporting member 42, adapted to be inserted under the base piece 31 of the windshield, when the windshield is in fully elevated position, to hold the windshield firmly in place, to take up any lost motion otherwise possible between the parts and also to close the opening between the windshield and the top of its compartment, which might otherwise fill with dirt, dust or moisture. This member 42 consists of a plate similar in length to the width of the windshield and has a flat plate like portion 43, from which is formed a bent-up or lapped over portion 44, the edge 45 of which, where the member 42 is inserted under the windshield base, abuts against the face of the base member 31 and acts as a stop to determine the placement of the supporting member 43. When it is desired to lower the windshield the member 43 may readily be withdrawn and stored in any convenient portion of the car body. When it is desired to lift the windshield the link members 40 can be rocked laterally toward the opposite sides of the car body and the pins 41 traversing the slots 35 and 36 will lift the windshield. By withdrawing the members 40 from this position toward the center of the car body the windshield is drawn downwardly into its compartment.

The opposite lateral frame members 33 and 34 are each provided midway of their length with pins 46, which engage and carry a slotted sliding guide member 47 adapted to travel upwardly and downwardly with the movement of the windshield, so that when the windshield is in fully elevated position, the member 47 will prevent undue lateral movement thereof during the operation of the car and which when the windshield is lowered, is likewise lowered with it into its compartment.

These guide members 47 are of U-shaped construction, their extended arm portions 48 being adapted to loosely engage the front and back of the windshield frame members 34 and 33 and are provided with slotted sections 49, to receive and be carried upon the pins 46. These slots 49 are provided so that the members 47 may be of the desired size and length and as well permit the windshield when lowered into its compartment to be completely retained therein.

Referring once again more particularly to Fig. 2, and in order to provide a protective means for protecting the driver in inclement weather, we provide the aforementioned member 37 with an attachable cover 50, which is adapted to be connected to the upper edge of the ordinary windshield 51 by any of the well-known button fastenings or analogous means. Thus it will be obvious that by providing side screens connectible to the aforesaid cover member 50, the driver may be closed in and fully protected when driving against a storm or with a storm driving at right angles to the machine.

Although we have shown and described a specific form of our invention, we do not wish to be strictly limited thereby, for it will be obvious that modifications of construction may be employed without departing from the spirit or scope of our invention. Furthermore, we wish it clearly understood that we do not desire in any way to limit ourselves to the precise form or method of raising and lowering the deck or cover 2, it being obvious to those acquainted with the art that various other means or mechanical equivalents may be adopted without in any way departing from the spirit and scope of our invention, as hereinbefore particularly described. Still further it will be obvious to those acquainted with the art that the pattern or style of the deck or cover 2 will naturally have to be varied to accommodate our invention to prevailing style of roadsters. Another feature we desire to lay emphasis on in conclusion is the combination between the deck or cover and the windshield at the back of the driver's seat, as by the use and co-operation of these two features, and the provision of side curtains to the deck or cover 2, we may close in and completely protect any goods or merchandise being transported when the machine is being used as an express wagon.

Having described our invention, what we claim as new and desire to secure by Letters Patent is:

1. In a convertible body for motor cars, the combination of an adjustable windshield, a slotted supporting frame therefor and rocking link members provided with pins near their ends, said pins being adapted to engage the slotted portion of the supporting frame to raise and lower said windshield.

2. In a convertible body for motor cars, the combination of a car body member, an adjustable windshield disposed transversely in said body member, a supporting frame therefor, provided with a slotted top member, rocking link members pivoted at their bottom ends to the car body portion, and pin members mounted upon the upper ends of said link members engaging the slotted portion of said top member and adapted to move therein to hold said windshield in elevated position.

3. In a convertible body for motor cars, the combination of a car body member, an adjustable windshield disposed transversely in said body member, a supporting frame therefor provided with a slotted top member, rocking link members pivotally mounted at their bottom ends on the car body portion, pin members mounted upon the upper ends of said link members engaging said slotted portions of said top member and adapted to move therein to hold said windshield when elevated, and guide members slidably mounted on opposite edge members of said supporting frame adapted to hold said windshield against lateral movement.

4. In a convertible body for motor cars, the combination of a car body member, an adjustable windshield, a supporting frame therefor provided with a slotted top member, rocking link members pivotally mounted on opposite sides of said body portion adjacent said supporting frame, pin members mounted on said link member adapted to engage the slotted portions of said top member and hold said windshield when elevated, and transversely disposed substantially parallel partition members mounted in said car body member adapted to receive and retain said windshield when lowered.

5. In a convertible body for motor cars, the combination of a car body member, an adjustable windshield, a supporting frame therefor provided with a slotted top member having an angularly extended top portion, rocking link members adapted to engage said slotted top member and hold said windshield when elevated, transversely disposed substantially parallel partition members built into said car body and adapted to receive and retain said windshield when lowered, and said angularly extended portion of said top member being adapted to bridge the partition members and close the space between the tops of said members when said windshield is lowered.

6. In a convertible body for motor cars, the combination of a lower body portion, a separable deck or cover member, link members pivotally attached at one end to said deck or cover, sliding members mounted in the base of the lower car body portion pivotally supporting the other ends of said link members, rack members engaging one end of said sliding members, pinions engaging said rack members and adapted to be actuated by lever and ratchet means to actuate said sliding and link members to raise and lower the deck or cover.

7. In a convertible body for motor cars, the combination of a lower body portion, a separable deck or cover member, link members pivotally attached at one end to said deck or cover, sliding members mounted in the base of the lower car body portion, guiding channel members retaining said sliding members in operative relation, said sliding members pivotally connecting with said link members near the other ends thereof, rack members mounted in the base of said body portion and pivotally connected to said sliding members, guiding channel members retaining said rack members in operative relation, a transverse shaft rotatable in said body portion, pinions fixedly mounted on said shaft and adapted to rotate therewith, said pinions meshing with said racks and adapted to slidably actuate said rack and sliding members and actuate said link members to raise and lower the deck or cover.

8. In a convertible body for motor cars, the combination of a lower body portion, a separable deck or cover member, link members pivotally connected at one end to said deck or cover, longitudinally sliding members mounted in the base of said body portion pivotally connected to the other ends of said link members, swivelled guide rings rotatably mounted on the inner opposite sides of the lower body portion near their upper edges, said swivelled guide rings receiving and slidably retaining said link members and adapted to limit the movement of said link members, and ratchet and lever actuated rack and pinion means adapted to actuate said sliding and link members to raise and lower said deck or cover.

9. In a convertible body for motor cars, the combination of a lower body portion, a separable deck or cover member, brackets firmly attached to the underside of said deck or cover, link members pivoted at one end to said brackets, longitudinally sliding members mounted in the base of said body portion pivotally connected to the other ends of said link members, swivelled guide rings rotatably mounted on the inner opposite sides of the body portion near their upper edges, said swivelled guide rings receiving and slidably retaining said link members and adapted to limit and guide the movement of said link member, rack members pivotally connected to said sliding members, and ratchet and lever operated pinions meshing with said rack members adapted to move said sliding members longitudinally back and forth and actuate said link members to raise or lower said top or cover.

10. In a convertible body for motor cars, the combination of a lower body portion, a separable deck or cover member, link members pivotally connected to said cover members, a transverse shaft rotatably mounted in journals or bearings in the forward portion of the bottom of the lower body portion, a pinion fixedly mounted on each end of said shaft and adapted to rotate therewith, an intermediate pinion fixedly mounted on said shaft and adapted to rotate therewith, a lever rockably mounted on said shaft adjacent said intermediate pinion, a ratchet mounted pivotally on said lever and adapted to engage said intermediate pinion, a plunger carried on said lever adapted to control and be connected with said ratchet, a rack mounted in the base of said body portion adapted to engage each of said end pinions, and a sliding member mounted in the base of said body portion adapted to engage said rack and link members, said lever and ratchet engaging said intermediate pinion being adapted to rotate said shaft and end pinions and actuate longitudinally said racks and sliding members and said link members to raise and lower said deck or cover member.

In testimony whereof we affix our signatures.

HERMAN NYSTROM.
RUDOLPH E. NELSON.